US012595877B2

(12) United States Patent
Tu et al.

(10) Patent No.: US 12,595,877 B2
(45) Date of Patent: Apr. 7, 2026

(54) INFORMATION PROCESSING DEVICE MOUNTING SYSTEM

(71) Applicant: HEWLETT PACKARD ENTERPRISE DEVELOPMENT LP, Spring, TX (US)

(72) Inventors: Wei-Chen Tu, Taipei (TW); Chi-Ting Yang, Taipei (TW); Chia-Yuan Liu, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 15 days.

(21) Appl. No.: 18/773,780

(22) Filed: Jul. 16, 2024

(65) Prior Publication Data

US 2026/0022797 A1      Jan. 22, 2026

(51) Int. Cl.
*F16M 13/02*          (2006.01)

(52) U.S. Cl.
CPC ......... *F16M 13/02* (2013.01); *F16M 2200/02* (2013.01)

(58) Field of Classification Search
CPC .... F16M 13/02; F16M 2200/02; F16M 11/16; F16M 11/041
USPC ................................................... 248/225.11
See application file for complete search history.

(56) References Cited

U.S. PATENT DOCUMENTS

| | | |
|---|---|---|
| 2006/0261227 A1 | 11/2006 | Petrick et al. |
| 2007/0018062 A1 | 1/2007 | Calinescu |
| 2009/0308999 A1 | 12/2009 | Kim et al. |
| 2010/0224751 A1 | 9/2010 | Hochhalter et al. |
| 2011/0017888 A1 | 1/2011 | Sangiuliano |
| 2014/0282071 A1 | 9/2014 | Trachtenberg et al. |
| 2015/0305178 A1 | 10/2015 | Cassidy et al. |
| 2017/0138530 A1 | 5/2017 | Neukam et al. |
| 2019/0301670 A1* | 10/2019 | Glickstein ............ F16M 11/041 |
| 2021/0148507 A1* | 5/2021 | Vinton ................. F16M 11/041 |
| 2025/0067090 A1* | 2/2025 | Kelsch ................ E05B 73/0082 |

* cited by examiner

*Primary Examiner* — Todd M Epps
(74) *Attorney, Agent, or Firm* — Hewlett Packard Enterprise Patent Department

(57)          ABSTRACT

Mounting system includes a device bracket attached to, or part of, chassis of a device, and a support bracket attached to support structure for holding the device. The device bracket includes plateau, slots in the plateau, basin recessed from and encircled by the plateau, second plateau protruding from and encircled by the basin, and VESA holes in the second plateau. The support bracket includes face, ridge protruding from the face, second basin recessed from and encircled by the ridge, and spools arranged in the face. The device bracket is attachable to a VESA mount component via the VESA holes or to the support bracket by engaging the ridge with rim of the basin, moving the device bracket towards the support bracket to protrude the ridge and spools into the basin and slots, respectively, in unlocked positions, and sliding the device bracket to move the spools into locked positions in the slots.

20 Claims, 13 Drawing Sheets

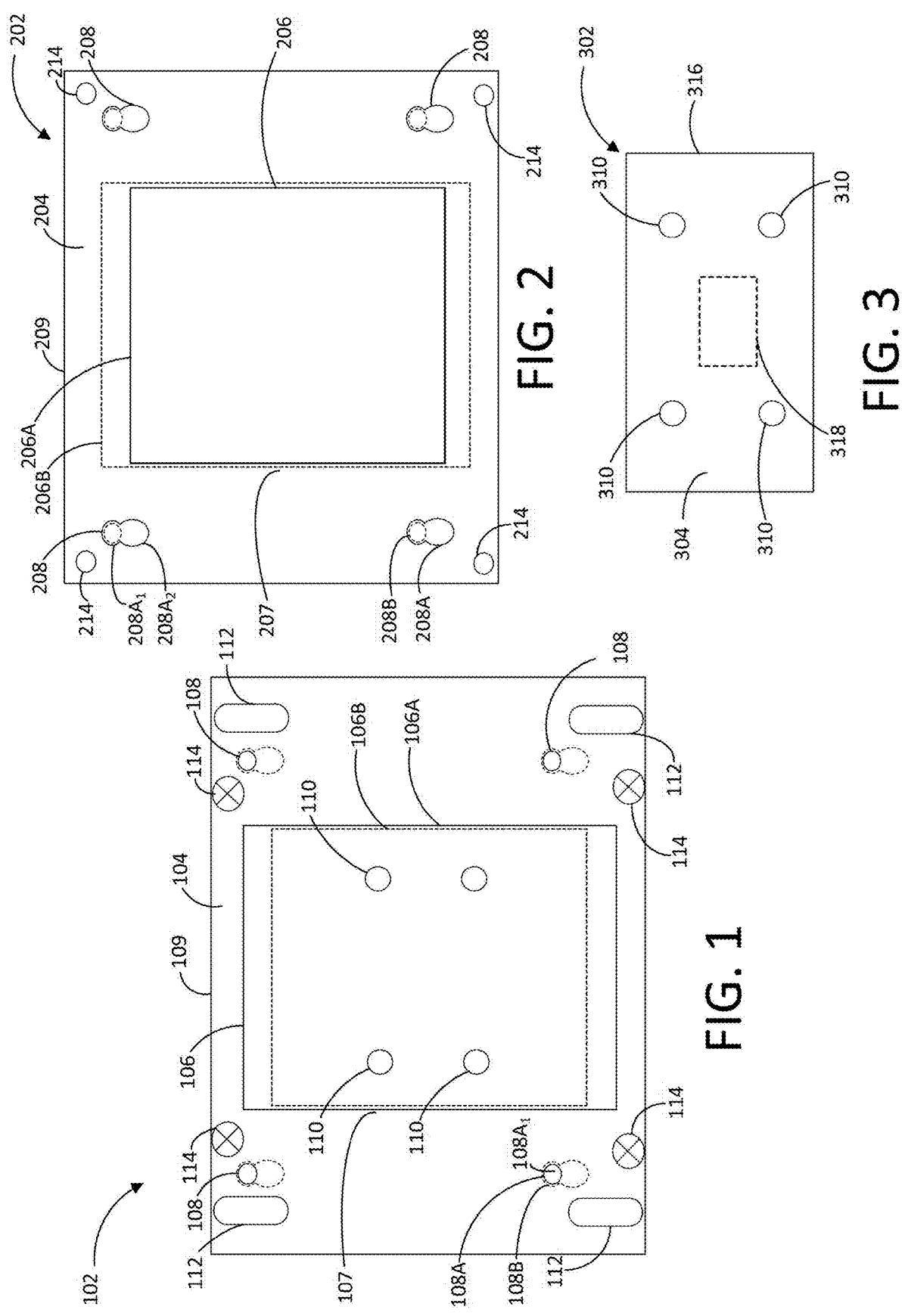

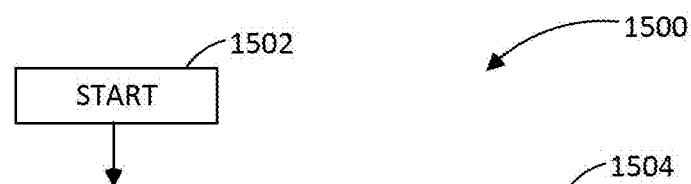

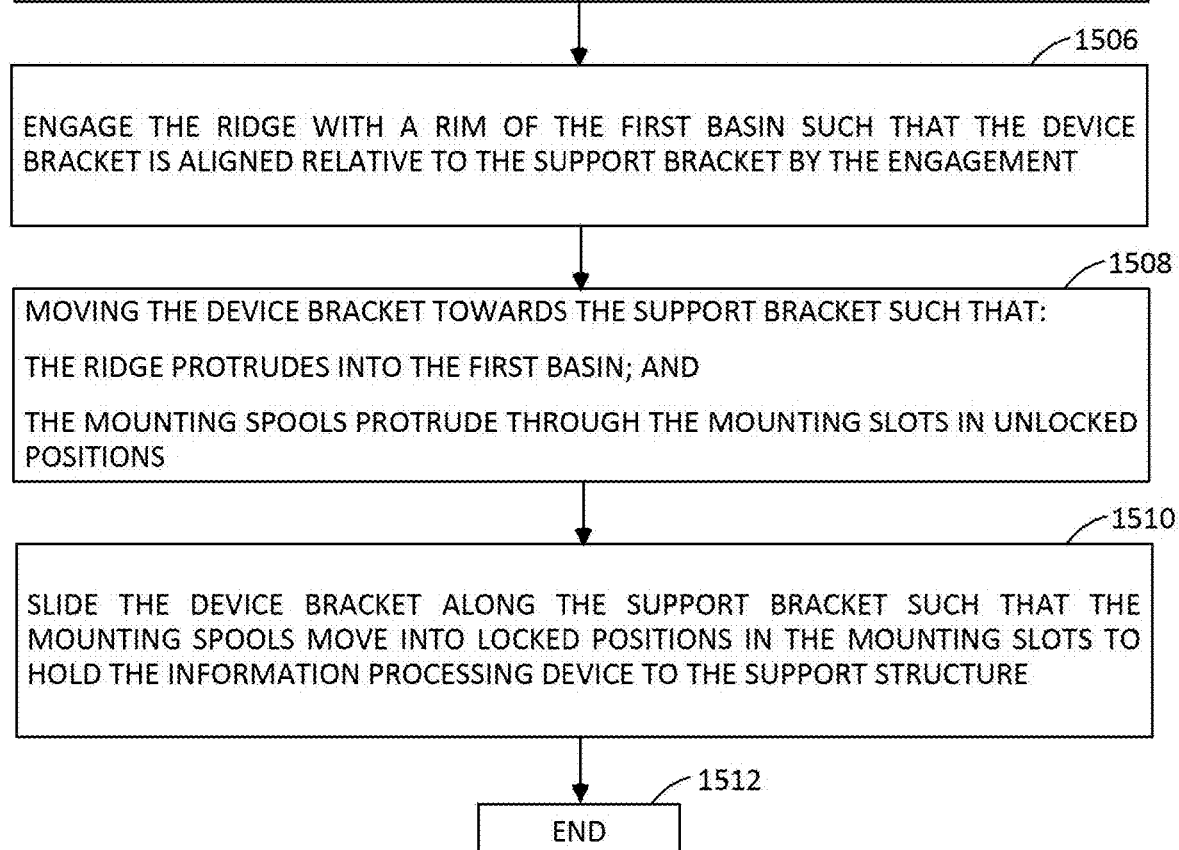

1502
START

1500

1504
POSITION AN ASSEMBLY INCLUDING AN INFORMATION PROCESSING DEVICE AND A DEVICE BRACKET ADJACENT TO A SUPPORT BRACKET ATTACHED TO A SUPPORT STRUCTURE,

WHERE THE DEVICE BRACKET IS ATTACHED TO OR PART OF A CHASSIS OF THE INFORMATION PROCESSING DEVICE AND INCLUDES A FIRST PLATEAU, A SET OF MOUNTING SLOTS IN THE FIRST PLATEAU, A FIRST BASIN RECESSED FROM AND ENCIRCLED BY THE FIRST PLATEAU, A SECOND PLATEAU PROTRUDING FROM AND ENCIRCLED BY THE FIRST BASIN, AND A SET OF VESA MOUNTING HOLES ARRANGED IN A VESA COMPATIBLE PATTERN IN THE SECOND PLATEAU, AND

WHERE THE SUPPORT BRACKET INCLUDES A FIRST FACE, A RIDGE PROTRUDING FROM THE FIRST FACE, A SECOND BASIN RECESSED FROM AND ENCIRCLED BY THE RIDGE, AND A SET OF MOUNTING SPOOLS ARRANGED IN THE FIRST FACE.

1506
ENGAGE THE RIDGE WITH A RIM OF THE FIRST BASIN SUCH THAT THE DEVICE BRACKET IS ALIGNED RELATIVE TO THE SUPPORT BRACKET BY THE ENGAGEMENT

1508
MOVING THE DEVICE BRACKET TOWARDS THE SUPPORT BRACKET SUCH THAT:

THE RIDGE PROTRUDES INTO THE FIRST BASIN; AND

THE MOUNTING SPOOLS PROTRUDE THROUGH THE MOUNTING SLOTS IN UNLOCKED POSITIONS

1510
SLIDE THE DEVICE BRACKET ALONG THE SUPPORT BRACKET SUCH THAT THE MOUNTING SPOOLS MOVE INTO LOCKED POSITIONS IN THE MOUNTING SLOTS TO HOLD THE INFORMATION PROCESSING DEVICE TO THE SUPPORT STRUCTURE

1512
END

FIG. 15

INFORMATION PROCESSING DEVICE MOUNTING SYSTEM

BACKGROUND

Mounting brackets are often utilized to mount and hold one object to another object. In particular, the mounting brackets may function as intermediate components for mounting and holding one or more devices to a support structure. The devices may include information processing devices such as access points (APs), micro servers, or the like, and the support structure may include a desk, a floor, a cart, a ceiling, a wall of a datacenter environment, buildings, or the like.

BRIEF DESCRIPTION OF THE DRAWINGS

Various examples will be described below with reference to the following figures.

FIG. 1 illustrates a block diagram of a device bracket of an information processing device mounting system according to an example of the present disclosure.

FIG. 2 illustrates a block diagram of a support bracket of an information processing device mounting system according to an example of the present disclosure.

FIG. 3 illustrates a block diagram of a portion of a VESA mount component of an information processing device mounting system according to an example of the present disclosure.

FIG. 15 is a flowchart depicting a method of mounting an information processing device to a support bracket using an information processing device mounting system according to one example of the present disclosure.

DETAILED DESCRIPTION

Figure 4A:
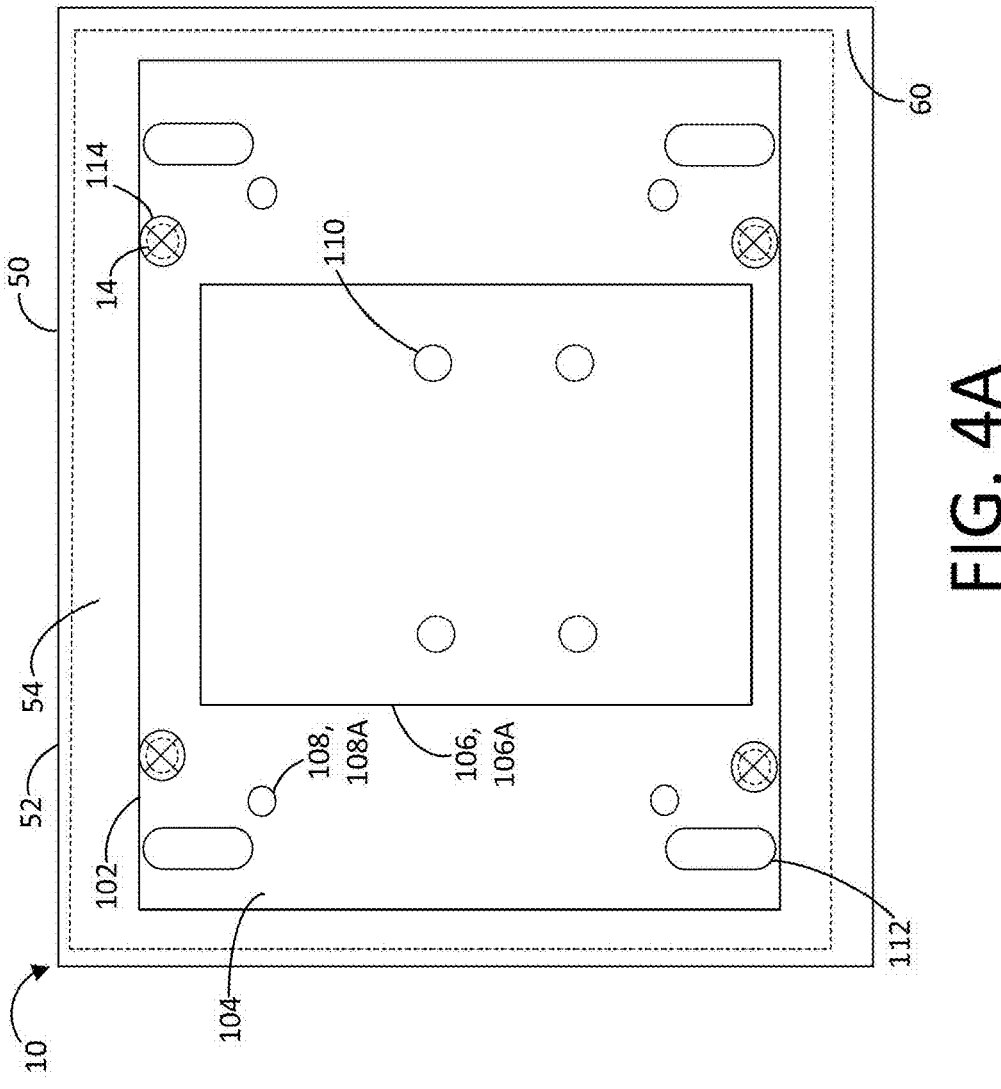
FIG. 4A illustrates a block diagram of a device bracket of FIG. 1 attached to an information processing device according to the example of the present disclosure.

The following detailed description refers to the accompanying drawings. For purposes of explanation, certain examples are described with reference to the components illustrated in FIGS. 1-15. The functionality of the illustrated components may overlap, however, and may be present in a fewer or greater number of elements and components. Moreover, the disclosed examples may be implemented in various environments and are not limited to the illustrated examples. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Mounting brackets come in a variety of styles. These may include VESA mounting brackets which are configured to mount an information processing device to a VESA support and non-VESA mounting brackets which are configured to mount the information processing device to other supports, such as shelves, walls, or the like. It may be noted herein that "VESA" belongs to a family of rules defined by the Video Electronics Standards Association for mounting and holding an electronic device such as flat screens, monitors, televisions, or information processing devices such as micro servers, access point, or the like to the supports.

Generally, VESA mounts and non-VESA mounts are provided as separate kits, and therefore customers may need to order different types of mounting brackets to mount and hold the information processing device to the supports, and this may be cumbersome to manage. In addition, multiple different types of mounting brackets may need to be produced, and this may result in additional SKUs being needed and different inventory to be maintained, which can in turn increase costs. Furthermore, replacing the mounting bracket with a new type of mounting bracket may be cumbersome, time consuming, expensive, and depend on the availability of inventory of such new compatible mounting bracket.

In addition, some non-VESA mounts may be difficult to install. For example, some non-VESA mounts may require mounting features of a device bracket attached to the information processing device to be aligned with complementary mounting features of a support bracket attached to the support (e.g., wall), but aligning these mounting and complementary features can be challenging because the information processing device blocks visibility of the alignment features when attempting to mount the device bracket to the support bracket. Furthermore, the device bracket and/or the support bracket may require separate locking features to secure the device bracket attached to the support bracket and prevent accidental falling-off of the device bracket from the support bracket.

A technical solution to the aforementioned problems includes providing an information processing device mounting system that includes a device bracket having both VESA mounting features and non-VESA mounting features so as to allow the device bracket to be attached to one of a VESA mount component having the VESA mounting features, or a support bracket having the non-VESA mounting features and hold an information processing device to a support structure.

In some examples, the device bracket may include the VESA mounting features such as a first set of VESA mounting holes arranged in a VESA compatible pattern on the device bracket, and the VESA mount component may also include the VESA mounting features such as a second set of VESA mounting holes arranged in the VESA compatible pattern on the VESA mount component. In such examples, in a state of the device bracket being positioned on the VESA mount component, the first set of VESA mounting holes are aligned with the second set of VESA mounting holes, and a set of fasteners extends through the first and second sets of VESA mounting holes to attach the device bracket to the VESA mount component.

In some other examples, the device bracket may include the non-VESA mounting features such as a set of mounting slots or a set of mounting spools. In such examples, the device bracket may include complementary non-VESA mounting features such as the set of mounting spools or the set of mounting slots. Additionally, the device bracket may include a first guide structure and the support bracket may include a second guide structure. In such examples, the device bracket may be positioned on the support bracket, the first and second guide structures may engage with each other so as to align the device bracket relative to the support bracket. Further, the device bracket may be moved towards the support bracket such that the first and second guide structures may direct the first and second set of mounting features to engage with one another in unlocked positions. Later, the device bracket may slide along the support bracket such that the first guide structure may be moved into locked positions in the second guide structure, thereby securing the device bracket to the support bracket. In some examples, the first guide structure may include a concave portion, and the second guide structure may include a convex portion. In such examples, the convex portion may include a ridge, or a plateau and the concave portion may include a basin to receive the ridge or the plateau. In some other examples, the second guide structure may include the concave portion, and the first guide structure may include the convex portion. In such examples, the convex portion may include a ridge, or a plateau and the concave portion may include a basin to receive the ridge or the plateau.

Since the device bracket may be designed to make it compatible with both VESA mount component and support bracket, the device bracket provides flexibility, upgradability, serviceability, reduced costs, and supply chain benefits. In particular, there may be no need to maintain or produce different types of device brackets, each having different types of mounting features (e.g., VESA mounting features or non-VESA mounting features), and therefore the costs associated with designing and producing multiple types of mounting systems can be avoided. In addition, the number of SKUs that are needed can be reduced and the need to maintain different inventories thereof can be avoided, which can in turn decrease costs. Further, since the first guide feature of the device bracket and the second guide feature of the support bracket are designed as self-aligning guide fixtures, the device bracket may not require tools or special fixtures to mount the device bracket to the support bracket. Hence, the device bracket is inexpensive to assemble, maintain, and replace. Additionally, since the first and second guide features self-aligns the device and support brackets to one another, the first set of mounting features of the support bracket may be easily engaged with the second set of mounting features of the support structure in the unlocked positions. Furthermore, since the first set of mounting features of the device bracket may be moved between lock and unlock positions to secure and release the device bracket from the support bracket, respectively, there is no additional requirement to have a separate locking element to secure the device bracket to the support bracket.

Figure 4B:
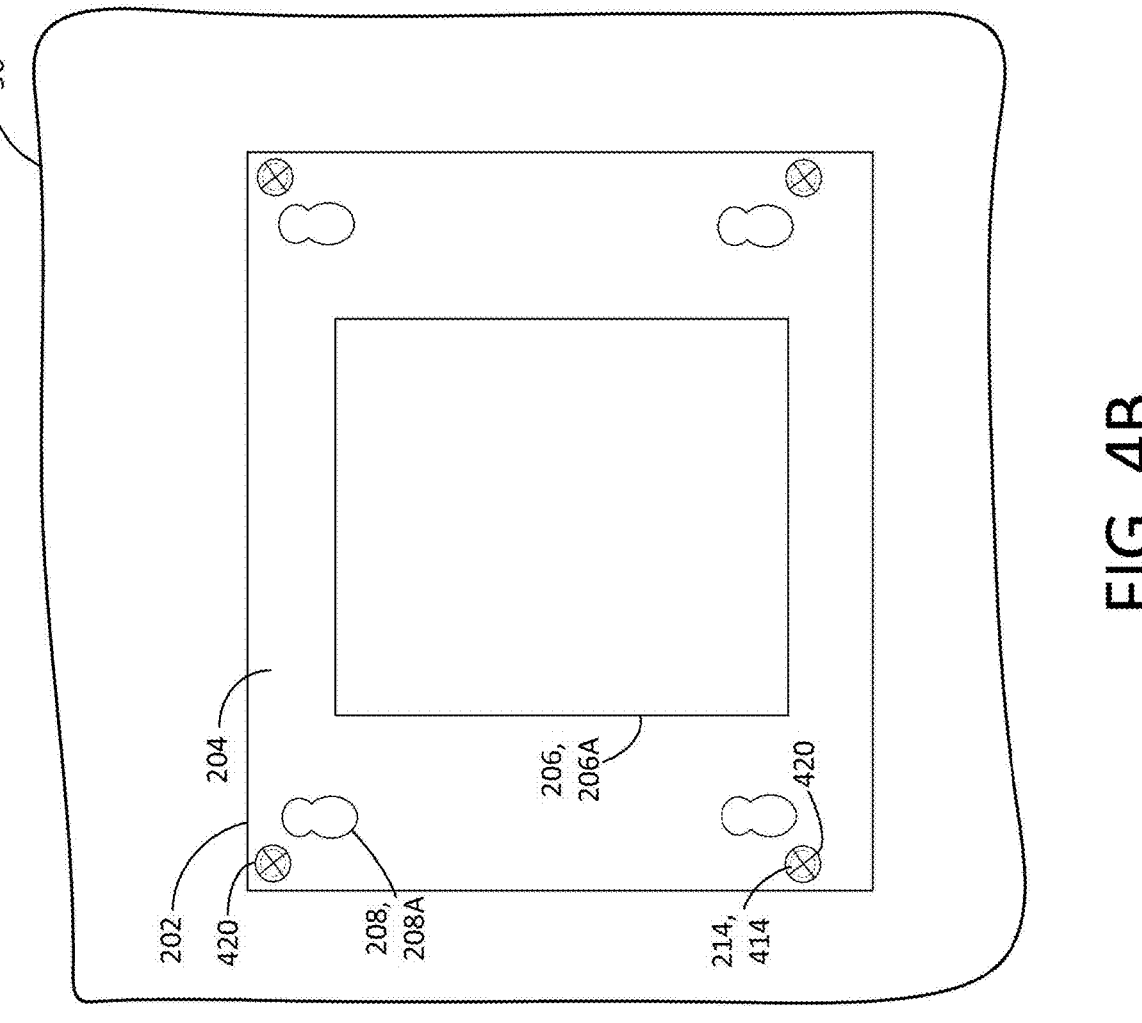
FIG. 4B illustrates a block diagram of a support bracket of FIG. 2 attached to a support structure according to the example of the present disclosure.
Figure 4C:
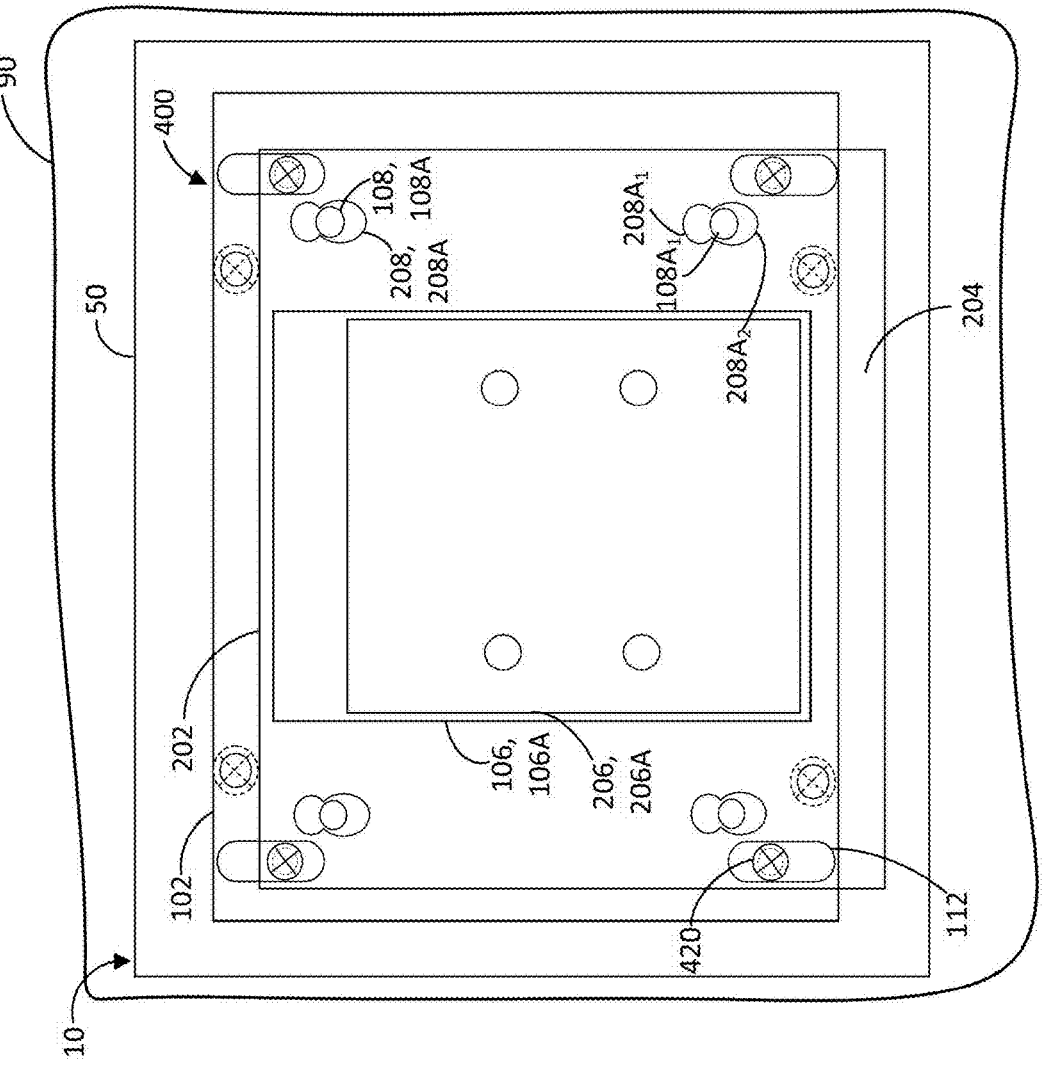
FIG. 4C illustrates a block diagram of an information processing device mounting system having the device bracket of FIG. 4A attached to the support bracket of FIG. 4B in unlocked positions according to the example of the present disclosure.
Figure 4D:
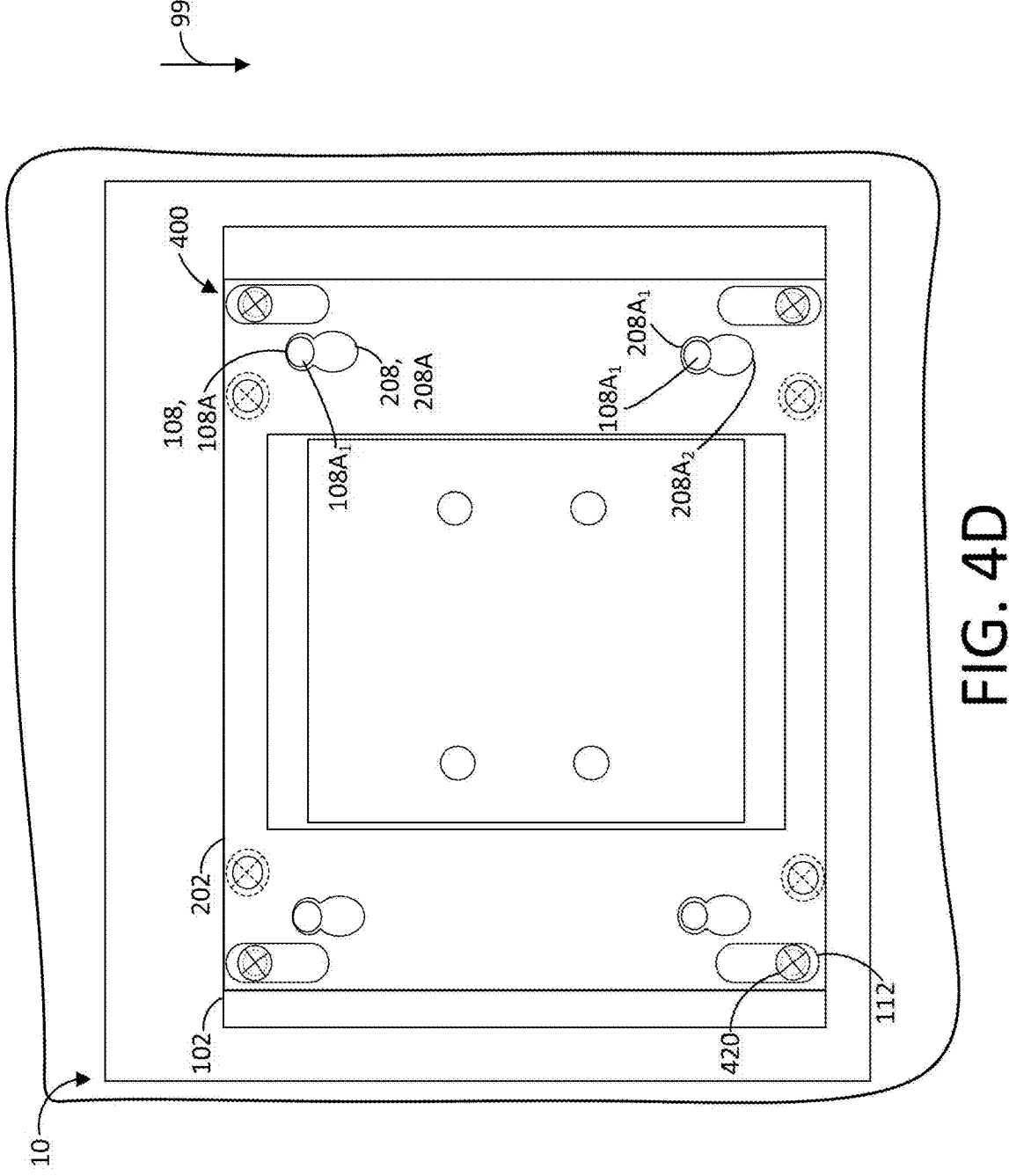
FIG. 4D illustrates a block diagram of the information processing device mounting system of FIG. 4C moved from the unlocked positions to locked positions according to the example of the present disclosure.
Figure 5:
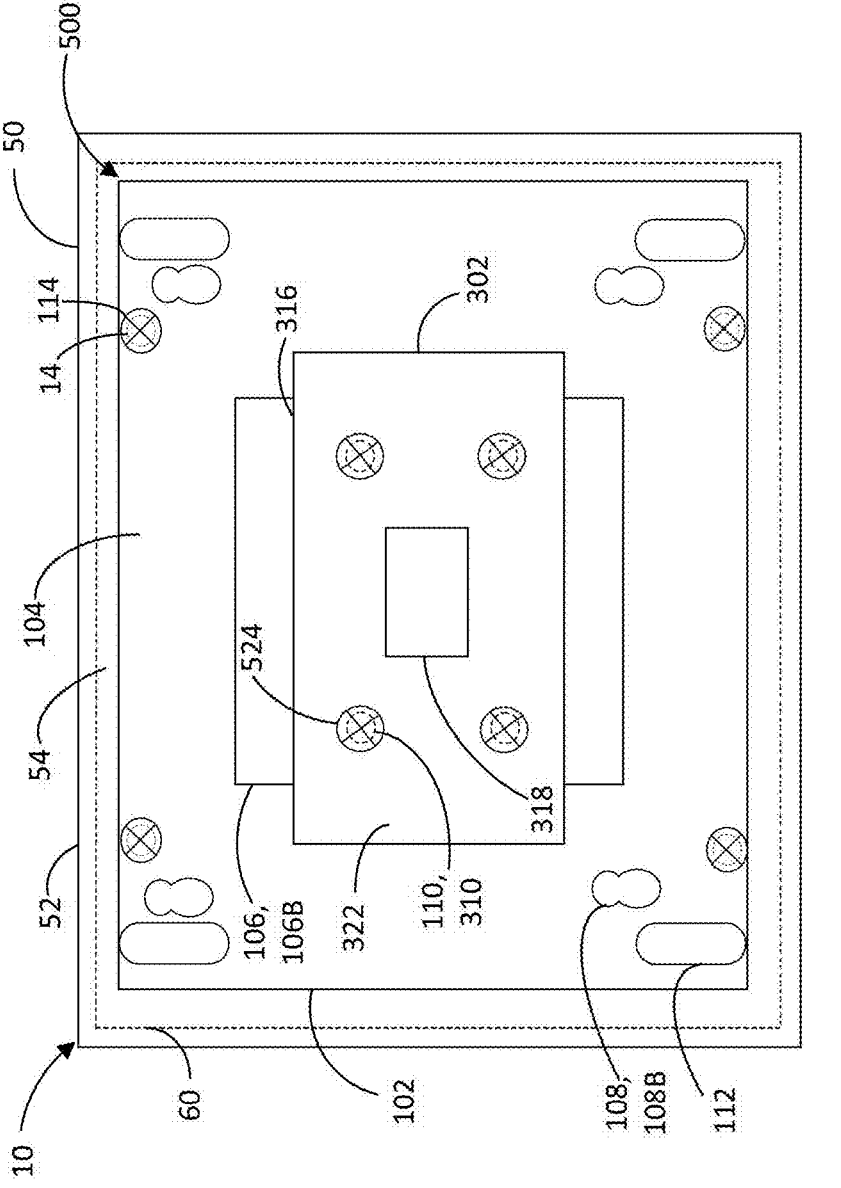
FIG. 5 illustrates a block diagram of an information processing device mounting system including the device bracket of FIG. 1 attached to the VESA mount component of FIG. 3 according to an example of the present disclosure.

Referring to Figures, FIG. 1 depicts a block diagram of a device bracket 102 of information processing device mounting systems 400, 500 (as shown in FIGS. 4C-4D and 5, respectively). It should be understood that FIG. 1 is not intended to illustrate specific shapes, dimensions, or other structural details accurately or to scale, and that implementations of the device bracket 102 may have different numbers and arrangements of the illustrated components and may also include other parts that are not illustrated. The device bracket 102 is a device support component, which may be configured to be attached to, or being part of, an information processing device 10 (as shown in FIGS. 4A, 4C, and 4D and 5) of an information processing system. It may be noted herein that the information processing system may include one or more information processing devices 10. In the example of FIG. 1, the device bracket 102 includes a face (not shown), a first face 104 opposite to the face, a first guide structure 106, a first set of mounting features 108, a set of VESA mounting holes 110, a plurality of clearance openings 112, and a plurality of captive fasteners 114.

In some examples, when the device bracket 102 is a separate component, the face of the device bracket 102 is configured to be disposed on and attached to a chassis 50 (as shown in FIGS. 4A, 4C, and 4D, and 5) of the information processing device 10. The first face 104 of the device bracket 102 is configured to be disposed on a support bracket 202 (as shown in FIG. 2). In some other examples, the first face 104 may be configured to be disposed on a VESA mount component 302 (as shown in FIG. 3).

The first guide structure 106 is used to align the device bracket 102 with the support bracket 202 and direct the device bracket 102 to be moved relative to the support bracket 202 so as to dispose the device bracket 102 on the support bracket 202. In some examples, the first guide structure 106 is disposed at a center 107 of the device bracket 102. Further, the first guide structure 106 may be coupled to the first face 104 or stamped on the first face 104. In some examples, the first guide structure 106 includes a concave portion 106A. In such examples, the concave portion 106A may include a basin. In some other examples, the first guide structure 106 may include a convex portion 106B (as shown in dotted line). In such examples, the convex portion 106B may include a ridge or a plateau.

The first set of mounting features 108 is used to attach the device bracket 102 to the support bracket 202, when the device bracket 102 is disposed on the support bracket 202. In some examples, the first set of mounting features 108 is disposed on the first face 104 and located adjacent to a perimeter 109 of the device bracket 102. The first set of mounting features 108 includes mounting spools 108A which are coupled to the first face 104. In some other examples, the first set of mounting features 108 includes mounting slots 108B (as shown in dotted lines) which may be formed by stamping or drilling the first face 104. In the example of FIG. 1, the device bracket 102 includes four mounting spools 108A.

The set of VESA mounting holes 110 is used to attach the device bracket 102 to the VESA mount component 302. In some examples, the set of VESA mounting holes 110 is arranged in a VESA compatible pattern in the first guide structure 106. It may be noted herein that "VESA" is a family of rules defined by the Video Electronics Standards Association. In the example of FIG. 1, the device bracket 102 includes four VESA mounting holes 110.

The plurality of clearance openings 112 is used, in a state of the device bracket 102 being mounted to the support bracket 202, to provide clearance to the device bracket 102 to move relative to the support bracket 202. In other words, each of the plurality of clearance openings 112 is configured to not obstruct the motion of the device bracket 102 by providing clearance from fasteners (not shown) that are used to couple the support bracket 202 to a support structure 90 (as shown in FIGS. 4B-4D). In one or more examples, each of the plurality of clearance openings 112 is an elongated opening. In the example of FIG. 1, the device bracket 102 includes four clearance openings 112.

The plurality of captive fasteners 114 is used to couple the device bracket 102 to the chassis 50, when the device bracket 102 is disposed on the chassis 50. In the example of FIG. 1, the device bracket 102 includes four captive fasteners 114.

FIG. 2 depicts a block diagram of a support bracket 202 of an information processing device mounting system 400 (as shown in FIGS. 4C and 4D). It should be understood that FIG. 2 is not intended to illustrate specific shapes, dimensions, or other structural details accurately or to scale, and that implementations of the support bracket 202 may have different numbers and arrangements of the illustrated components and may also include other parts that are not illustrated. The support bracket 202 is a support component, which may be configured to be attached to a support structure 90 (as shown in FIGS. 4B-4D). In such examples, the support bracket 202 may be further configured to hold an information processing device 10 (as shown in FIGS. 4A, 4C, and 4D) attached to the device bracket 102. The support bracket 202 includes a second face 204, a third face (not shown) opposite to the second face 204, a second guide structure 206, a second set of mounting features 208, and a plurality of second coupling openings 214.

The second face 204 of the support bracket 202 is configured to receive the first face 104 of the device bracket 102, when the device bracket 102 is disposed on the support bracket 202. The third face of the support bracket 202 is configured to be disposed on and couped to the support structure 90 (as shown in FIGS. 4B-4D).

The second guide structure 206 is used to align the device bracket 102 with the support bracket 202 and direct the device bracket 102 to move relative to the support bracket 202 so as to dispose the device bracket 102 on the support bracket 202. In some examples, the second guide structure 206 is disposed at a center 207 of the support bracket 202. Further, the second guide structure 206 may be coupled to the second face 204 or stamped on the second face 204. In some examples, the first guide structure 106 and the second guide structure 206 include complementary convex and concave portions. Accordingly, in some examples, the second guide structure 206 includes a convex portion 206A. In such examples, the convex portion 206A may include a ridge or a plateau. In other words, the second guide structure 206 may be complementary guide structure to the first guide structure 106. For example, when the first guide structure 106 in the device bracket 102 includes the concave portion 106A, then the second guide structure 206 in the support bracket 202 includes the convex portion 206A. In some other examples, the second guide structure 206 may include a concave portion 206B (as shown in dotted line). In such examples, the concave portion 206B may include a basin.

The second set of mounting features 208 is used to attach the device bracket 102 to the support bracket 202, when the device bracket 102 is disposed on the support bracket 202. The second set of mounting features 208 is disposed on the second face 204 and located adjacent to a perimeter 209 of the support bracket 202. In some examples, the second set of mounting features 208 includes mounting slots 208A which may be formed by stamping or drilling the second face 204. In other words, the second set of mounting features 208 may be complementary mounting features to the first set of mounting features 108. For example, when the first set of mounting features 108 in the device bracket 102 is the mounting spools 108A, then the second set of mounting features 208 in the support bracket 202 is the mounting slots 208A. In some examples, each mounting slot 208A has a first portion $208A_1$ with a first width and a second portion $208A_2$ with a second width which is greater than the first width. The first portion $208A_1$ is coupled to the second portion $208A_2$. Similarly, each mounting spool 108A of the plurality for mounting spools 108A may include a post (not shown) having a third width which is smaller than the first width of the first portion $208A_1$ and a cap $108A_1$ having a fourth width which is larger than the first width of the first portion $208A_1$ and smaller than the second width of the second portion $208A_2$. In such examples, each mounting spool 108A may be engaged with the first portion $208A_1$ of the mounting slot 208A in an unlocked position of the device bracket 102 to the support bracket 202 and each mounting spool 108A may be further engaged with the second portion $208A_2$ of the mounting slot 208A in a locked position of the device bracket 102 to the support bracket 202. In some other examples, the second set of mounting features 208 may include mounting spools 208B which may be coupled to the second face 204 (as shown in dotted lines). In the example of FIG. 2, the support bracket 202 includes four mounting features 208.

The plurality of second coupling openings 214 may be used to couple the support bracket 202 to the support structure 90. In the example of FIG. 2, the support bracket 202 includes four coupling openings 214.

FIG. 3 depicts a block diagram of a portion of a VESA mount component 302 of an information processing device mounting system 500 (as shown in FIG. 5). It should be understood that FIG. 3 is not intended to illustrate specific shapes, dimensions, or other structural details accurately or to scale, and that implementations of the VESA mount component 302 may have different numbers and arrangements of the illustrated components and may also include other parts that are not illustrated. The VESA mount component 302 is an intermediary overhanging component, which may be configured to attach to the device bracket 102 pre-attached to an information processing device 10 (as shown in FIG. 5). In such examples, the VESA mount component 302 may be further configured to be attached to any structure, e.g., the support bracket 202 attached to the support structure 90 so as to hold the information processing device 10 to the support structure 90. In some examples, the VESA mount component 302 includes a VESA mount plate 316 and an VESA arm 318 (shown in dotted line).

The VESA mount plate 316 includes a fourth face 304, a fifth face 322 (as shown in FIG. 5) opposite to the fourth face 304, and a set of second VESA mounting holes 310 arranged in a VESA compatible pattern in the VESA mount plate 316. It may be noted herein that "VESA" is a family of rules defined by the Video Electronics Standards Association. In some examples, the fourth face 304 may be disposed on the first face 104 of the device bracket 102. In such examples, the set of second VESA mounting holes 310 may be used to attach the device bracket 102 to the VESA mount component 302. In the example of FIG. 3, the VESA mount component 302 includes four second VESA mounting holes 310.

The VESA arm 318 of the VESA mount component 302 may extend from or coupled to the fifth face of the VESA mount plate 316. Further, the VESA arm 318 may be configured to be attached to any structure e.g., the support bracket 202 attached to the support structure 90, or directly to the support structure 90 such as a desk, a floor, a cart, a ceiling, a wall of a datacenter environment, buildings, or the like, to provide support for the information processing device 10.

FIG. 4A depicts a block diagram of a device bracket 102 of FIG. 1 attached to an information processing device 10. The information processing device 10 includes a chassis 50 and a primary system board 60 housed in the chassis 50. For example, the chassis 50 includes a base 52 having an inner face (not labeled) configured to house the primary system board 60, and an outer face 54 configured to attach to the device bracket 102. In particular, the base 52 may include a plurality of first coupling openings 14, which may be used to attach the device bracket 102 to the base 52 of the chassis 50. As discussed hereinabove, the device bracket 102 includes a face (not shown), a first face 104 opposite to the face, a first guide structure 106, a first set of mounting features 108, a set of VESA mounting holes 110, a plurality of clearance openings 112, and a plurality of captive fasteners 114. In the example of FIG. 4A, the first guide structure 106 includes a concave portion 106A and the first set of mounting features 108 includes mounting spools 108A.

In some examples, the device bracket 102 is disposed on the base 52 such that the face of the device bracket 102 is seated on the outer face 54 of the base 52 and the plurality of captive fasteners 114 of the device bracket 102 is aligned with the plurality of first coupling openings 14 of the base 52. In such examples, each captive fastener of the plurality of fasteners 120 extends into a corresponding first coupling opening 14 in the information processing device 10 to couple the device bracket 102 to the information processing device 10.

FIG. 4B depicts a block diagram of a support bracket 202 of FIG. 2 attached to a support structure 90. In some examples, the support structure 90 may include a desk, a floor, a cart, a ceiling, a wall of a datacenter environment, buildings, or the like. The support structure 90 may include a plurality of third coupling openings 414 which are configured to receive fasteners 420 to attach the support bracket 202 to the support structure 90. As discussed hereinabove, the support bracket 202 includes a second face 204, a third face (not shown) opposite to the second face 204, a second guide structure 206, a second set of mounting features 208, and a plurality of second coupling openings 214. In the example of FIG. 4A, the second guide structure 206 includes a convex portion 206A and the second set of mounting features 208 includes mounting slots 208A.

In some examples, the support bracket 202 is disposed on the support structure 90 such that the third face of the support bracket 202 is seated on an outer face of the support structure 90 and a plurality of second coupling openings 214 of the device bracket 102 is aligned with the plurality of third coupling openings 314 of the support structure 90. In such examples, a fastener of the plurality of fasteners 420 extends into a corresponding second and third coupling openings 214, 314 to couple the support bracket 202 to the support structure 90.

FIG. 4C depicts a block diagram of an information processing device mounting system 400 having the device bracket 102 of FIG. 4A and attached to a support bracket 202 of FIG. 4B in unlocked positions. It may be noted that the primary system board 60 is not shown in the example of FIG. 4C for ease of illustration and such an illustration should not be construed as a limitation of the present disclosure. As discussed hereinabove, the information processing device 10 is attached to the device bracket 102 and the support bracket 202 is attached to the support bracket 202. In such examples, the device bracket 102 is positioned such that the first face 104 of the device bracket 102 faces the second face 204 of the support bracket 202. Further, the device bracket 102 is disposed on the support bracket 202 such that the concave portion 106A of the device bracket 102 and the convex portion 206A of the support bracket 202 are engaged with one another, thereby aligning the device bracket 102 relative to the support bracket 202.

Further, the device bracket 102 is moved towards the support bracket 202 such that a ridge (not shown) of the convex portion 206A protrudes into a first basin (not shown) of the concave portion 106A, the mounting spools 108A of the device bracket 102 engage with the mounting slots 208A of the support bracket 202 in unlocked positions, and each of the plurality of fasteners 420 is aligned with a corresponding clearance opening of the plurality of clearance openings 112 in the device bracket 102. In the unlocked positions, each mounting spool 108A is positioned in the second portion $208A_2$ of the corresponding mounting slots 208A. In particular, the post and the cap $108A_1$ of each mounting spool 108A is positioned in the second portion $208A_2$.

FIG. 4D depicts a block diagram of the information processing device mounting system 400 of FIG. 4C moved from the unlocked positions to locked positions. In some examples, the device bracket 102 is slid along the support bracket 202 such that the mounting spools 108A and the mounting slots 20A move from the unlocked positions to locked positions. In the example of FIG. 4D, the device bracket 102 is slid along a second axis 2 perpendicular to the first face 104. In the locked positions, each mounting spool 108A is positioned in the first portion $208A_1$ of the corresponding mounting slots 208A, thereby preventing the corresponding mounting slots 208A to move out from the mounting spools 108A and lock the device bracket 102 to the support bracket 202. In particular, the post and the cap 108A₁ of each mounting spool 108A is positioned in the first portion 208A₁ and lock the device bracket 102 to the support bracket by gravity and prevent the accidental fall-off of the device bracket 102 from the support bracket 202. In some examples, when the device bracket 102 is slide along the vertical direction, each opening of the plurality of clearance openings 112 pass through a corresponding fastener 420 to provide clearance and not obstruct the motion of the device bracket 102.

FIG. 5 depicts a block diagram of an information processing device 10 attached to an information processing device mounting system 500 having a device bracket 102 of FIG. 1 attached to a VESA mount component 302 of FIG. 3. The information processing device 10 includes a chassis 50 and a primary system board 60 housed in the chassis 50. For example, the chassis 50 includes a base 52 having an inner face (not labeled) configured to house the primary system board 60, and an outer face 54 configured to attach to the device bracket 102. In particular, the base 52 may include a plurality of first coupling openings 14, which may be used to attach the device bracket 102 to the base 52 of the chassis 50. As discussed hereinabove, the device bracket 102 includes a face (not shown), a first face 104 opposite to the face, a first guide structure 106, a first set of mounting features 108, a set of VESA mounting holes 110, a plurality of clearance openings 112, and a plurality of captive fasteners 114. In the example of FIG. 5, the first guide structure 106 includes a convex portion 106B and the first set of mounting features 108 includes mounting slots 108B.

In some examples, the device bracket 102 is disposed on the base 52 such that the face of the device bracket 102 is seated on the outer face 54 of the base 52 and the plurality of captive fasteners 114 of the device bracket 102 is aligned with the plurality of first coupling openings 14 of the base 52. In such examples, each captive fastener of the plurality of fasteners 120 extends into a corresponding first coupling opening 14 in the information processing device 10 to couple the device bracket 102 to the information processing device 10.

As discussed hereinabove, the VESA mount component 302 includes a VESA mount plate 316 and an VESA arm 318. The VESA mount plate 316 includes a fourth face 304 (as shown in FIG. 3), a fifth face 322 opposite to the fourth face 304, and a set of second VESA mounting holes 310 arranged in a VESA compatible pattern in the VESA mount plate 316. In the example of FIG. 3, the VESA mount component 302 includes four second VESA mounting holes 310.

As discussed hereinabove, the information processing device 10 is attached to the device bracket 102. Further, the VESA mount component 302 is attached to the device bracket 102. For example, the VESA mount plate 316 is positioned on the device bracket 102 such that the fourth face 304 of the VESA mount component 302 faces the first face 104 of the device bracket 102. Further, the VESA mount plate 316 is disposed on the first guide structure 105 of the device bracket 102 such that the set of second VESA mounting holes 310 of the VESA mount component 302 is aligned with the set of VESA mounting holes 110 of the device bracket 102. In such examples, a fastener of a plurality of fasteners 524 is extended into a corresponding VESA mounting hole 110 and second VESA mounting hole 310 to couple the VESA mount component 302 to the device bracket 102. Further, the VESA arm 318 extending from the fifth face 322 of the VESA mount plate 316 may be configured to be attached to any structure e.g., a support bracket 202 attached to a support structure 90 (as shown in FIG. 4B), or directly to the support structure 90 such as a desk, a floor, a cart, a ceiling, a wall of a datacenter environment, buildings, or the like, to provide support for the information processing device 10.

Figures 6, 7:
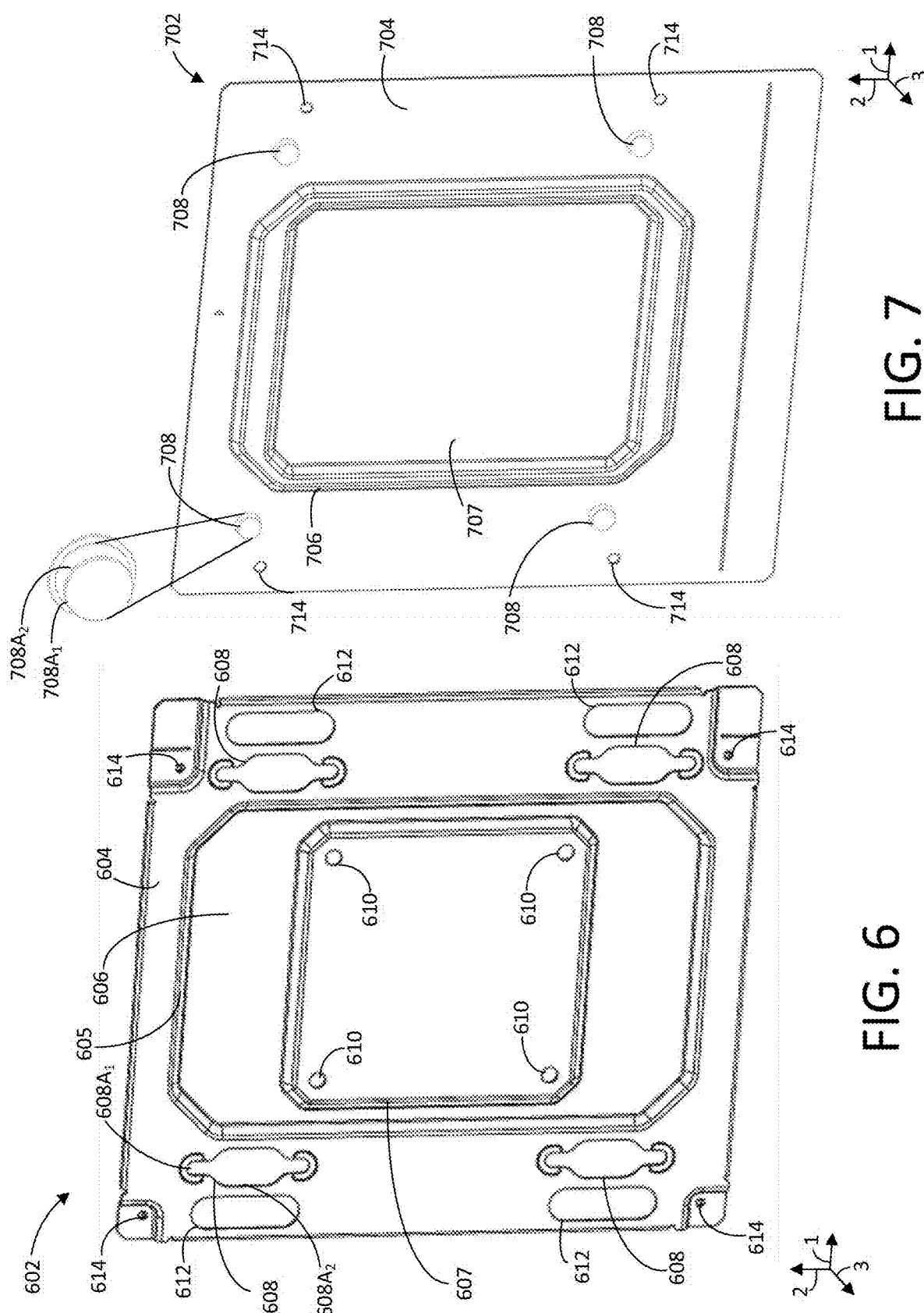
FIG. 6 illustrates a perspective view of a device bracket according to an example of the present disclosure.
FIG. 7 illustrates a perspective view of a support bracket according to an example of the present disclosure.

FIG. 6 depicts a perspective view of a device bracket 602. The device bracket 602 includes a first plateau 604, a first basin 606, a second plateau 607, a first set of mounting slots 608, a set of VESA mounting holes 610, a plurality of clearance openings 612, and a plurality of captive fasteners 614.

In some examples, the first basin 606 is recessed from and encircled by the first plateau 604 and the second plateau 607 is protruding from and encircled by the first basin 606. Further, the set of mounting slots 608, the plurality of clearance openings 612, and the plurality of captive fasteners 614 are formed in the first plateau 604. The set of VESA mounting holes 610 is arranged in a VESA compatible pattern in the second plateau 607. In some examples, each mounting slot of the set of mounting slots 608 has a first portion 608A₁ with a first width, and a second portion 608A₂ with a second width. The first portion 608A₁ is coupled to the second portion 608A₂. Further, each of the first and second widths extends along a first axis 1 parallel to the first face 104, and the second width is greater than the first width. In some examples, the first basin 606 has a fifth width extending along the first axis 1 and a first length extending along a second axis 2 perpendicular to the first axis 1. Similarly, the second plateau 607 has a sixth width extending along the first axis 1.

FIG. 7 depicts a perspective view of a support bracket 702. The support bracket 702 includes a first face 704, a ridge 706, a second basin 707, and a set of mounting spools 708.

In some examples, the ridge 706 protrudes from the first face 704 and the second basin 707 is recessed from and encircled by the ridge 706. Further, the set of mounting spools 708 and a plurality of second coupling openings 714 are arranged in the first face 704. The set of mounting spools 708 and a plurality of second coupling openings 714 are arranged in the first face 704. In some examples, each mounting spool of the plurality for mounting spools 708 includes a post 708A₂ having a third width and a cap 708A₁ having a fourth width. The cap 708A₁ is couped to the post 708A₂. Further, the third width of the post 708A₂ is smaller than the first width of the first portion 608A₁ of the corresponding mounting slot 608, and the fourth width of the cap 708A₁ is larger than the first width of the of the first portion 608A₁ of the corresponding mounting slot 608 and smaller than the second width of the second portion 608A₂ of the corresponding mounting slot 608. In some examples, the second basin 707 has a sixth width extending along the first axis 1 parallel to the first face 704. Similarly, the ridge 706 has an eighth width extending along the first axis 1 and a second length extending along a second axis 2 perpendicular to the first face 704.

Figure 8A:
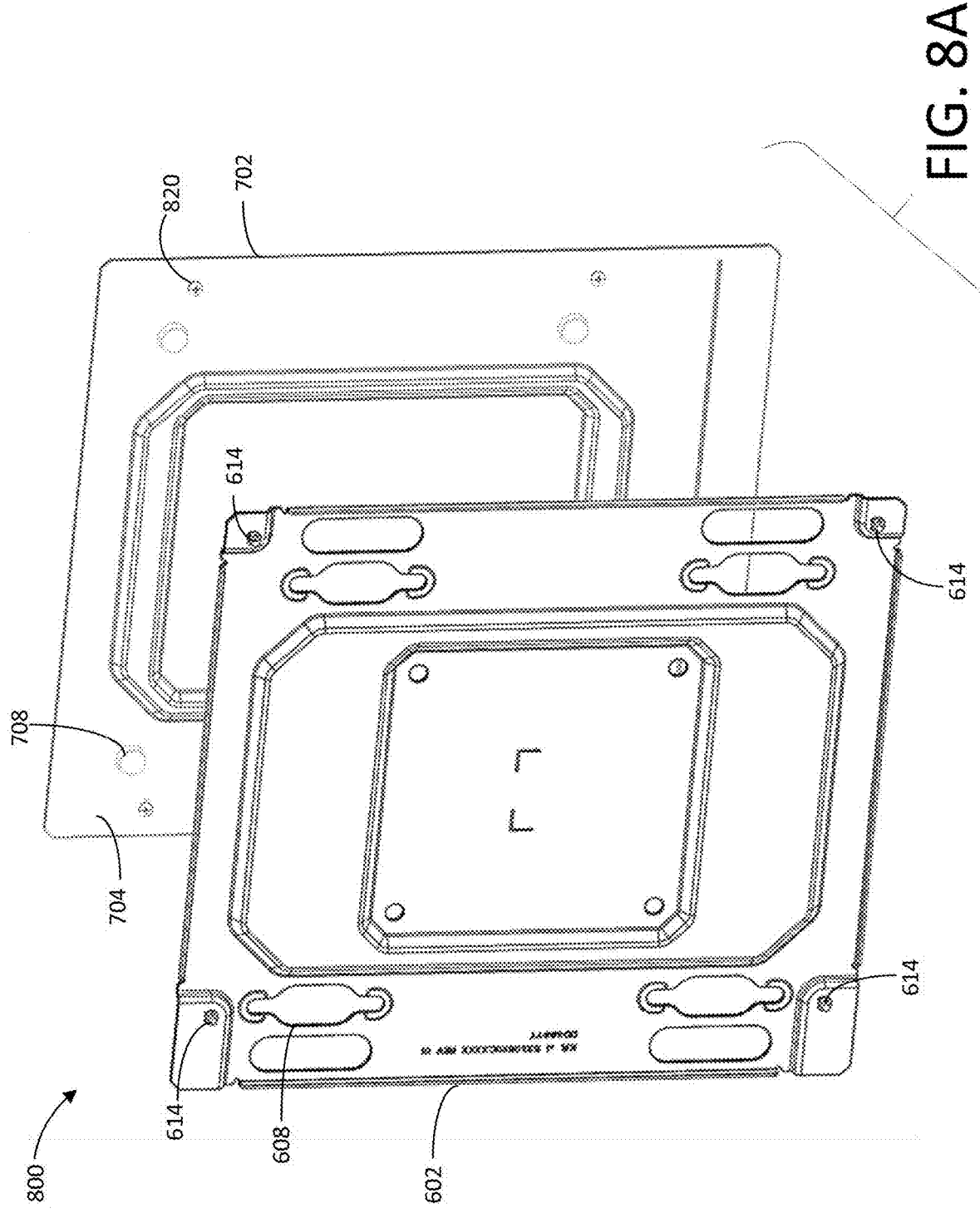
FIG. 8A illustrates an exploded perspective view of an information processing device mounting system having the device bracket of FIG. 6 and the support bracket of FIG. 7 according to an example of the present disclosure.

FIG. 8A depicts an exploded perspective view of an information processing device mounting system 800. In some examples, the information processing device mounting system 800 includes the device bracket 602 of FIG. 6 and the support bracket 702 of FIG. 7.

The device bracket 602 may be configured to be attached to, or being part of, a chassis of an information processing device (not shown). In the example, where the device bracket is a separate component and is attached to the chassis, the device bracket 602 may be disposed on the chassis such that the plurality of captive fasteners 614 is aligned to a plurality of coupling openings in the chassis. In such examples, the plurality of captive fasteners 614 may further extend through the plurality of coupling openings to attach the device bracket 602 to the chassis. Similarly, the support bracket 702 may be disposed on and mounted to a support structure (not shown). For example, the support bracket 702 may be disposed such that the plurality of second coupling openings 714 is aligned to a plurality of third coupling openings in the support structure. In such examples, a plurality of fasteners (not shown) may extend through the plurality of second coupling openings 714 and the plurality of third coupling openings to attach the support bracket 702 to the support structure. The device bracket 602 is further positioned over the support bracket 702 such that the first plateau 604 (as shown in FIG. 6) of the device bracket 602 faces the first face 704 of the support bracket 702.

Figures 8B, 8C:
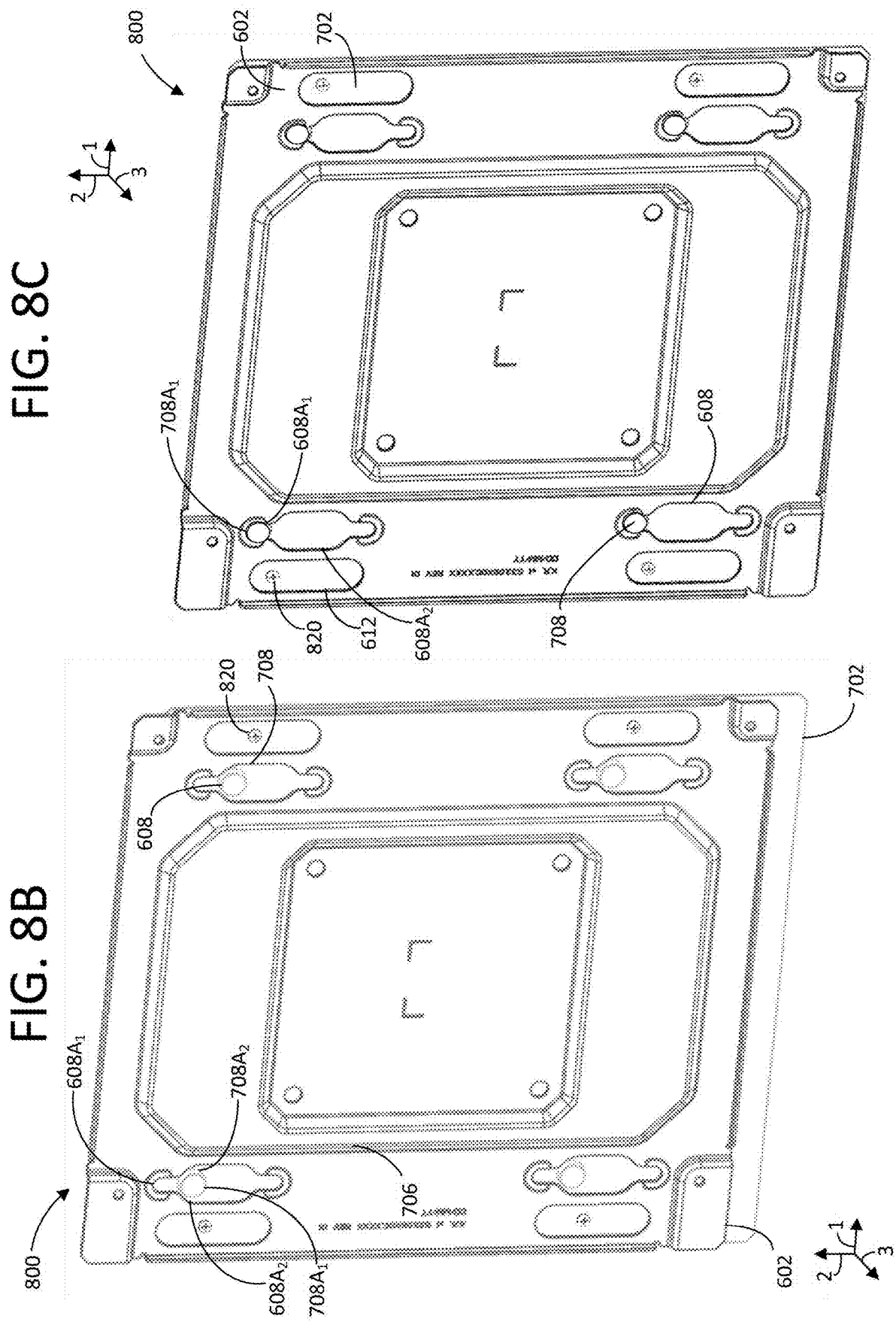
FIG. 8B illustrates an assembled perspective view of the information processing device mounting system of FIG. 8A having the support bracket holding the device bracket in unlocked positions according to an example of the present disclosure.
FIG. 8C illustrates an assembled perspective view of the information processing device mounting system of FIG. 8B having the support bracket holding the device bracket in locked positions according to an example of the present disclosure.

FIG. 8B depicts an assembled perspective view of the information processing device mounting system 800 of FIG. 8A having the support bracket 702 holding the device bracket 602 in unlocked positions. In some examples, the device bracket 602 is attached to the support bracket 702 in unlocked positions by first engaging the ridge 706 with a rim 605 of the first basin 606 (as shown in FIG. 6) such that the engagement aligns the device bracket 602 relative to the support bracket 702, and later by moving the device bracket 602 towards the support bracket 702 such that the ridge 706 protrudes into the first basin 606 and the mounting spools 708 protrude through the mounting slots 608 in unlocked positions. Since the ridge 706 and the first basin 606 have complementary profile, they assist the device bracket 602 to be self-aligned with the support bracket 702 and allow the mounting spools 708 to easily protrude through the mounting slots 608 in the unlocked positions. In one or more examples, the unlocked positions of the mounting spools 708 correspond to the mounting spools 708 being in the second portions 608A$_2$ of the mounting slots 608. In other words, in the unlocked positions, each mounting spool 708 is positioned in the second portion 608A$_2$ of the corresponding mounting slots 608. In particular, the post 708A$_2$ and the cap 708A$_1$ of each mounting spool 708 are positioned in the second portion 608A$_2$ of the corresponding mounting slots 608.

In one or more examples, respective widths of the ridge 706 and the first basin 606 are substantially equal, and respective widths of the second basin 707 and the second plateau 607 are substantially equal. In other words, the eighth width of the ridge 706 is substantially equal to the fifth width of the first basin 606. Similarly, the sixth width of the second basin 707 and the fourth width of the second plateau 607 are substantially equal. Accordingly, when the ridge 706 is engaged with the rim 605 of the first basin 606, such an engagement of the ridge 706 with the rim 605 of the first basin 606 constrains motion of the device bracket 602 to translation along the first axis 1. Additionally, in the state of the device bracket 602 being held against the support bracket 702, the ridge 706 protruding into the first basin 606, the second plateau 607 protrudes into the second basin 707 and engages with the ridge 706, and such an engagement of the ridge 706 with the second plateau 607 additionally constrains motion of the device bracket 602 to motion along the first axis 1.

In one or more examples, the first length of the first basin 606 exceeds the second length of the ridge 706. In such examples, when the ridge 706 protrudes into the first basin 606 and the second plateau 607 protrudes into the second basin 707 and engages with the ridge 706, such an engagement of the ridge 706 with the second plateau 607 additionally constrains motion of the device bracket 602 to motion along the first axis 1. In other words, the length of the first basin 606 exceeds the length of the ridge 706 such that the first basin 606 constrains the device bracket 602 to motion between a first position and a second position along the first axis 1. In such examples, on condition of the device bracket 602 being in the first position, the mounting spools 708 are in the unlocked positions, and on condition of the device bracket 602 being in the second position, the mounting spools 708 are in the locked positions.

FIG. 8C depicts an assembled perspective view of the information processing device mounting system 800 of FIG. 8B having the support bracket 702 holding the device bracket 602 in locked positions. In some examples, the device bracket 602 is attached to the support bracket 702 in locked positions by sliding the device bracket 602 along the support bracket 702 such that the mounting spools 708 move into locked positions in the mounting slots 608. In the example of FIG. 8C, the device bracket 602 is slid along a second axis 2. In one or more examples, the locked positions of the mounting spools 708 correspond to the mounting spools 708 being in the first portions 608A$_1$ of the mounting slots 608. In other words, in the locked positions, each mounting spool 708 is positioned in the first portion 608A$_1$ of the corresponding mounting slots 608, thereby preventing the corresponding mounting spools 708 to move out from the mounting slots 608 and lock the device bracket 602 to the support bracket 702. In particular, the post 708A$_2$ and the cap 708A$_1$ of each mounting spool 708 is positioned in the first portion 608A$_1$ and lock the device bracket 602 to the support bracket 702 by gravity and prevent the accidental fall-off of the device bracket 602 from the support bracket 702.

Additionally, in the state of the device bracket 602 being mounted to the support bracket 702, the plurality of clearance openings 612 aligns with the second coupling openings 714 (as shown in FIG. 7) and receives the fasteners 820. In such examples, each clearance opening 612 has a width and a length greater than a corresponding fastener 820 to not obstruct motion of the device bracket 602 relative to the support bracket. In other words, when the device bracket 602 slides along the second axis 2, each opening of the plurality of clearance openings 612 pass through a corresponding fastener 820 to provide clearance and not obstruct the motion of the device bracket 602.

Figures 9, 10:
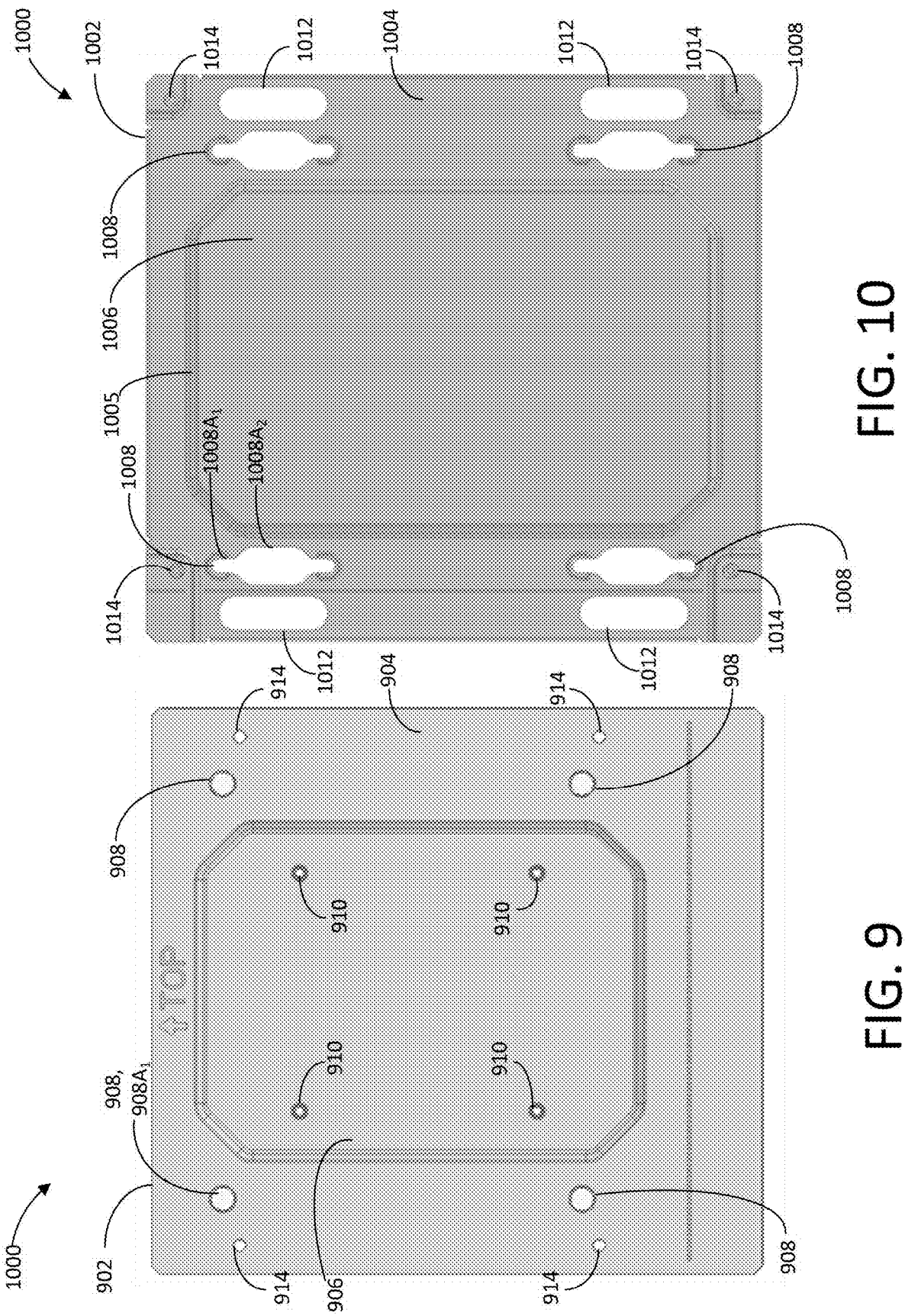
FIG. 9 illustrates a perspective view of a device bracket of an information processing device mounting system according to another example of the present disclosure.
FIG. 10 illustrates a perspective view of a support bracket of the information processing device mounting system of FIG. 9 according to another example of the present disclosure.

FIG. 9 depicts a perspective view of a device bracket 902 of an information processing device mounting system 1000. FIG. 10 depicts a perspective view of a support bracket 1002 of the information processing device mounting system 1000. In the description hereinafter, FIGS. 9 and 10 are described concurrently for ease of illustration.

The device bracket 902 includes a first face 904, a third plateau 906, and a set of mounting spools 908, a set of VESA mounting holes 910, and a plurality of captive fasteners holes 914. In some examples, the third plateau 906 protrudes from the first face 904 and is encircled by the first face 904. The set of VESA mounting holes 910 is arranged in a VESA compatible pattern in the third plateau 906. The set of mounting spools 908 and the plurality of captive fasteners holes 914 are formed in the third plateau 906. The plurality of captive fasteners holes 914 may be used to couple the device bracket 902 to an information processing device.

The support bracket 1002 includes a fourth plateau 1004, a third basin 1006, a set of mounting slots 1008, a plurality of clearance openings 1012, and a plurality of coupling openings 1014. In some examples, the third basin 1006 is recessed from and encircled by the fourth plateau 1004. Further, the set of mounting slots 1008, the plurality of clearance openings 1012, and the plurality of coupling openings 1014 are formed in the fourth plateau 1004. The plurality of coupling openings 1014 may be used to couple the support bracket 1002 to a support structure.

In one or more examples, the device bracket 902 may be attached to the support bracket 1002 to form the information processing device mounting system 1000 in unlocked positions by first engaging the third plateau 906 with a rim 1005 of the third basin 1006 such that the engagement aligns the device bracket 902 relative to the support bracket 1002, and later by moving the device bracket 902 towards the support bracket 1002 such that the third plateau 906 protrudes into the third basin 1006 and the mounting spools 908 protrude through the mounting slots 1008 in unlocked positions. In other words, in the unlocked positions, each mounting spool 908 may be positioned in the second portion 1008A$_2$ of the corresponding mounting slots 1008. In particular, a post (not shown) and a cap 908A$_1$ of each mounting spool 908 may be positioned in the second portion 1008A$_2$ of the corresponding mounting slots 1008 in the unlocked positions.

Further, the device bracket 902 is attached to the support bracket 1002 in locked positions by sliding the device bracket 902 along the support bracket 1002 such that the mounting spools 908 move from the unlocked positions into locked positions in the mounting slots 1008. In the locked positions, each mounting spool 908 may be positioned in the first portion 1008A$_1$ of the corresponding mounting slots 1008, thereby preventing the corresponding mounting spools 908 to move out from the mounting slots 1008 and lock the device bracket 902 to the support bracket 1002. In such examples, when the device bracket 902 slides relative to the support bracket 1002, each opening of the plurality of clearance openings 1012 pass through a corresponding fastener (not shown) that is used to couple the support bracket 1002 to the support structure so as to provide clearance and not obstruct the motion of the device bracket 902.

Figures 11, 12:
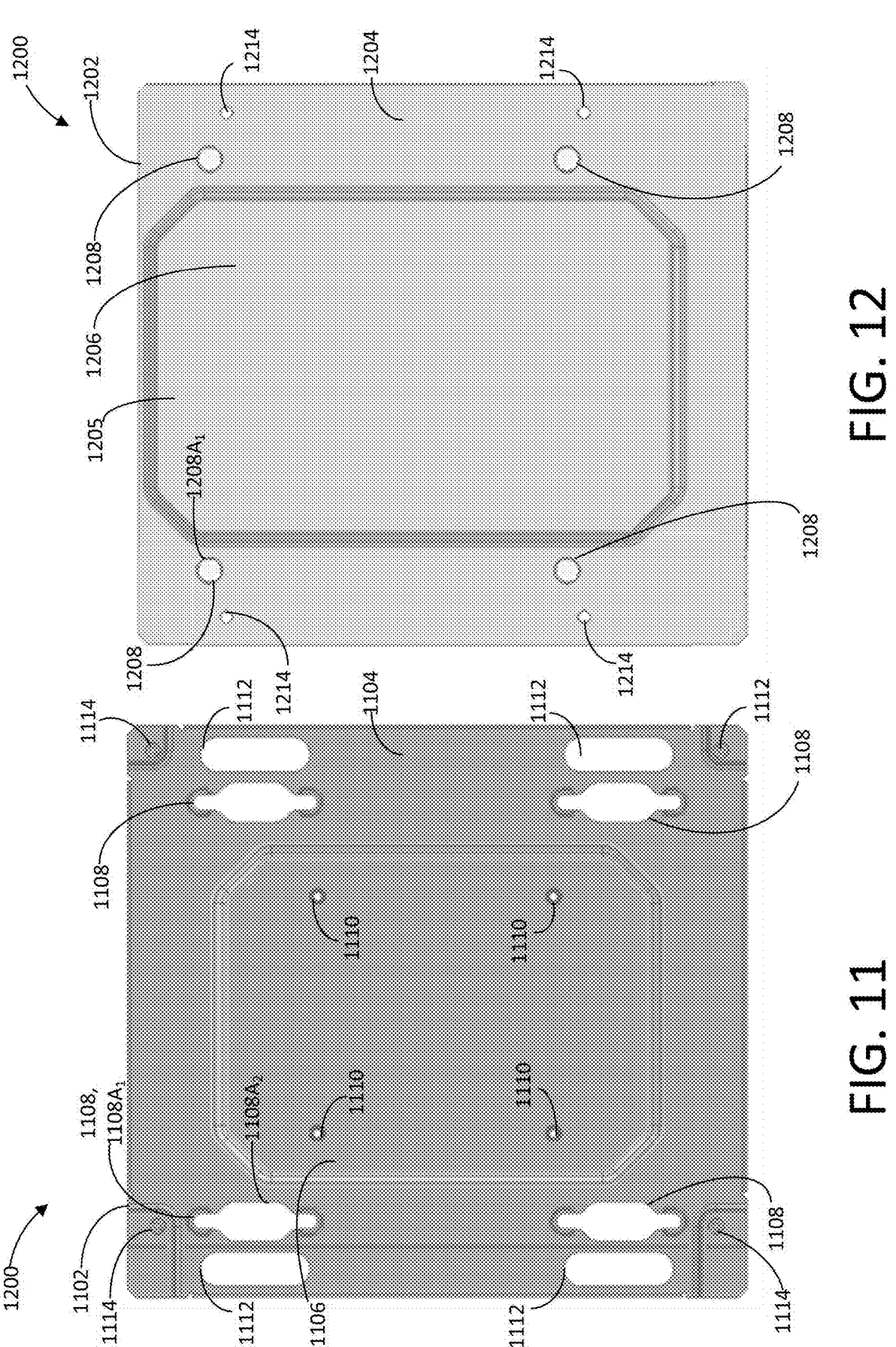
FIG. 11 illustrates a perspective view of a device bracket of an information processing device mounting system according to yet another example of the present disclosure.
FIG. 12 illustrates a perspective view of a support bracket of the information processing device mounting system of FIG. 11 according to yet another example of the present disclosure.

FIG. 11 depicts a perspective view of a device bracket 1102 of an information processing device mounting system 1200. FIG. 12 depicts a perspective view of a support bracket 1202 of the information processing device mounting system 1200. In the description hereinafter, FIGS. 11 and 12 are described concurrently for ease of illustration.

The device bracket 1102 includes a first face 1104, a third plateau 1106, and a set of mounting slots 1108, a set of VESA mounting holes 1110, and a plurality of captive fasteners holes 1114. In some examples, the third plateau 1106 protrudes from the first face 1104 and is encircled by the first face 1104. The set of VESA mounting holes 1110 is arranged in a VESA compatible pattern in the third plateau 1106. The set of mounting slots 1108 and the plurality of captive fasteners holes 1114 are formed in the third plateau 1106. The plurality of captive fasteners holes 1114 may be used to couple the device bracket 1102 to an information processing device.

The support bracket 1202 includes a fourth plateau 1204, a third basin 1206, a set of mounting spools 1208, a plurality of clearance openings 1212, and a plurality of coupling openings 1214. In some examples, the third basin 1206 is recessed from and encircled by the fourth plateau 1204. Further, the set of mounting spools 1208, the plurality of clearance openings 1212, and the plurality of coupling openings 1214 are formed in the fourth plateau 1204. The plurality of coupling openings 1214 may be used to couple the support bracket 1202 to a support structure.

In one or more examples, the device bracket 1102 may be attached to the support bracket 1202 to form the information processing device mounting system 1200 in unlocked positions by first engaging the third plateau 1106 with a rim 1205 of the third basin 1206 such that the engagement aligns the device bracket 1102 relative to the support bracket 1202, and later by moving the device bracket 1102 towards the support bracket 1202 such that the third plateau 1106 protrudes into the third basin 1206 and the mounting spools 1208 protrude through the mounting slots 1108 in unlocked positions. In other words, in the unlocked positions, each mounting spool 1208 may be positioned in the second portion 1108A$_2$ of the corresponding mounting slots 1108. In particular, a post (not shown) and a cap 1208A$_1$ of each mounting spool 1208 may be positioned in the second portion 1108A$_2$ of the corresponding mounting slots 1108 in the unlocked positions.

Further, the device bracket 1102 is attached to the support bracket 1202 in locked positions by sliding the device bracket 1102 along the support bracket 1202 such that the mounting spools 1208A move from the unlocked positions into locked positions in the mounting slots 1108. In the locked positions, each mounting spool 1208 may be positioned in the first portion 1108A$_1$ of the corresponding mounting slots 1108, thereby preventing the corresponding mounting spools 1208 to move out from the mounting slots 1108 and lock the device bracket 1102 to the support bracket 1202. In such examples, when the device bracket 1102 slides relative to the support bracket 1202, each opening of the plurality of clearance openings 1112 pass through a corresponding fastener (not shown) that is used to couple the support bracket 1202 to the support bracket 1202 by extending into the corresponding coupling opening 1214, so as to provide clearance and not obstruct the motion of the device bracket 1102.

Figures 13, 14:
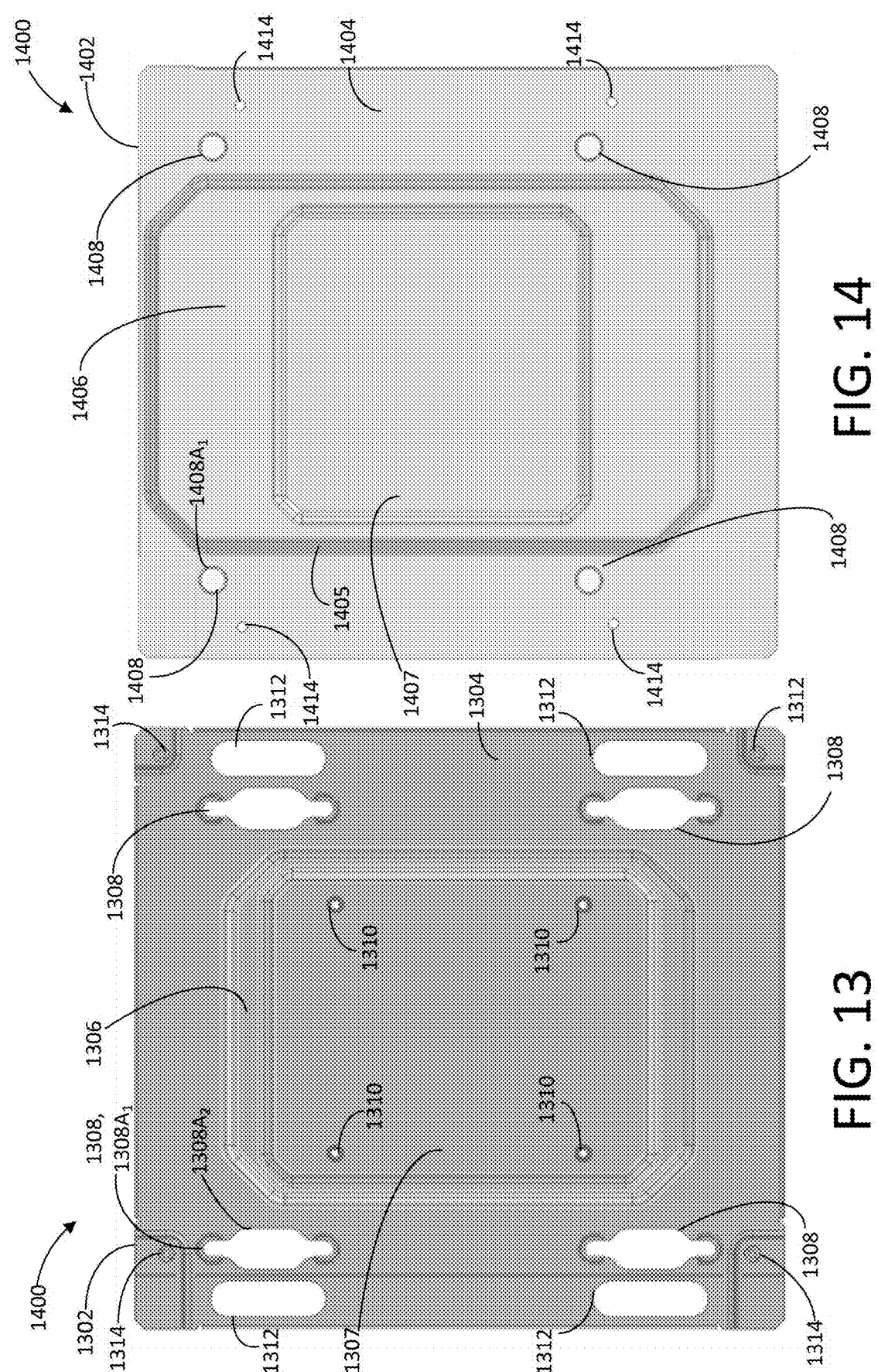
FIG. 13 illustrates a perspective view of a device bracket of an information processing device mounting system according to yet another example of the present disclosure.
FIG. 14 illustrates a perspective view of a support bracket of the information processing device mounting system of FIG. 13 according to yet another example of the present disclosure.

FIG. 13 depicts a perspective view of a device bracket 1302 of an information processing device mounting system 1400 and FIG. 14 depicts a perspective view of a support bracket 1402 of the information processing device mounting system 1400. In the description hereinafter, FIGS. 13 and 14 are described concurrently for ease of illustration.

The device bracket 1302 includes a first plateau 1304, a ridge 1306, a fourth basin 1307, a set of mounting slots 1308, a set of VESA mounting holes 1310, a plurality of clearance openings 1312, and a plurality of captive fasteners openings 1314. In some examples, the ridge 1306 protrudes from the first plateau 1304 and the fourth basin 1307 is recessed from and encircled by the ridge 1306. Further, the set of mounting slots 1308, the plurality of clearance openings 1312, and the plurality of captive fasteners openings 1314 are arranged in the first plateau 1304. The set of VESA mounting holes 1310 is arranged in a VESA compatible pattern in the fourth basin 1307.

The support bracket 1402 includes a fourth plateau 1404, a third basin 1406, a fifth plateau 1407, a set of mounting spools 1408, and a plurality of coupling openings 1414. In some examples, the third basin 1406 is recessed from and encircled by the fourth plateau 1404 and the fifth plateau 1407 is protruding from and encircled by the third basin 1406. Further, the set of mounting spools 1408 and the plurality of coupling openings 1414 are formed in the fourth plateau 1404.

In one or more examples, the device bracket 1302 may be attached to the support bracket 1402 to form the information processing device mounting system 1400 in unlocked positions by first engaging the ridge 1306 with a rim 1405 of the third basin 1406 such that the engagement aligns the device bracket 1302 relative to the support bracket 1402, and later by moving the device bracket 1302 towards the support bracket 1402 such that the ridge 1306 protrudes into the third basin 1406, and the mounting spools 1408 protrude through the mounting slots 1308 in unlocked positions. In the state of the ridge 1306 protruding into the third basin 1406, the fifth plateau 1407 protrudes into the fourth basin 1307. In one or more examples, the unlocked positions of the mounting spools 1408 correspond to the mounting spools 1408 being in the second portions 1308A$_2$ of the mounting slots 1308.

In some examples, the device bracket 1302 is attached to the support bracket 1402 in locked positions by sliding the device bracket 1302 along the support bracket 1402 such that the mounting spools 1408 move into locked positions in the mounting slots 1308. In one or more examples, the locked positions of the mounting spools 1408 correspond to the mounting spools 1408 being in the first portions 1308A$_1$ of the mounting slots 1308. In other words, in the locked positions, each mounting spool 1408 is positioned in the first portion 1308A$_1$ of the corresponding mounting slots 1308, thereby preventing the corresponding mounting spools 1408 to move out from the mounting slots 1308 and lock the device bracket 1302 to the support bracket 1402. In such examples, when the device bracket 1302 slides relative to the support bracket 1402, each opening of the plurality of clearance openings 1312 pass through a corresponding fastener (not shown) that is used to couple the support bracket 1402 to a support structure by extending into the corresponding coupling opening 1414, so as to provide clearance and not obstruct the motion of the device bracket 1302.

FIG. 15 depicts a flowchart depicting a method 1500 of mounting an information processing device to a support structure using an information processing device mounting system. It may be noted herein that the method 1500 is described in conjunction with FIGS. 1-2, 4A-4D, 6-7, and 8A-8C, for example. The method 1500 starts at block 1502 and continues to block 1504.

At block 1504, the method 1500 includes positioning an assembly including an information processing device and a device bracket adjacent to a support bracket attached to a support structure. In some examples, the device bracket is disposed on and coupled to a chassis of the information processing device to form the assembly, as discussed in the examples of FIG. 4A. In some examples, the device bracket is attached to or part of a chassis of the information processing device and includes a first plateau, a set of mounting slots in the first plateau, a first basin recessed from and encircled by the first plateau, a second plateau protruding from and encircled by the first basin, and a set of VESA mounting holes arranged in a VESA compatible pattern in the second plateau. Further, the support bracket includes a first face, a ridge protruding from the first face, a second basin recessed from and encircled by the ridge, and a set of mounting spools arranged in the first face. Accordingly, in one or more examples, positioning the assembly adjacent to the support bracket includes facing the first face of the device bracket with the second face of the support bracket. The method 1500 continues to block 1506.

At block 1506, the method 1500 includes engaging the ridge with a rim of the first basin such that the device bracket is aligned relative to the support bracket by the engagement. The process involved in the engagement of the ridge with the rim is discussed in the example of FIG. 4C. The method 1500 continues to block 1508.

At block 1508, the method 1500 includes moving the device bracket towards the support bracket such that the ridge protrudes into the first basin, and the mounting spools protrude through the mounting slots in unlocked positions. The process involved in the device bracket being mounted to the support bracket in the unlocked positions is discussed in the example of FIG. 4C. The method continues to block 1510.

At block 1510, the method 1500 includes sliding the device bracket along the support bracket such that the mounting spools move into locked positions in the mounting slots to hold the information processing device to the support structure. The process involved in the device bracket being mounted to the support bracket in the locked positions is discussed in the example of FIG. 4D. The method ends at block 1514.

Since the device bracket may be designed to make it compatible with both VESA mount component and support bracket, the device bracket provides flexibility, upgradability, serviceability, reduced costs, and supply chain benefits. In particular, there may be no need to maintain or produce different types of device brackets, each having different types of mounting features (e.g., VESA mounting features or non-VESA mounting features), and therefore the costs associated with designing and producing multiple types of mounting systems can be avoided. In addition, the number of SKUs that are needed can be reduced and the need to maintain different inventories thereof can be avoided, which can in turn decrease costs. Further, since the first guide feature of the device bracket and the second guide feature of the support bracket are designed as self-aligning guide fixtures, the device bracket may not require tools or special fixtures to mount the device bracket to the support bracket. Hence, the device bracket is inexpensive to assemble, maintain, and replace. Additionally, since the first and second guide features self-aligns the device and support brackets to one another, the first set of mounting features of the support bracket may be easily engaged with the second set of mounting features of the support structure in the unlocked positions. Furthermore, since the first set of mounting features of the device bracket may be moved between lock and unlock positions to secure and release the device bracket from the support bracket, respectively, there is no additional requirement to have a separate locking element to secure the device bracket to the support bracket.

In the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. An information processing device mounting system, comprising:
   a device bracket configured to be attached to, or being part of, a chassis of an information processing device; and
   a support bracket configured to be attached to a support structure for holding the information processing device,
   wherein the device bracket comprises a first plateau, a set of mounting slots in the first plateau, a first basin recessed from and encircled by the first plateau, a second plateau protruding from and encircled by the first basin, and a set of VESA mounting holes arranged in a VESA compatible pattern in the second plateau,
   wherein the support bracket comprises a first face, a ridge protruding from the first face, a second basin recessed from and encircled by the ridge, and a set of mounting spools arranged in the first face, wherein the device bracket is configured to be attachable to a VESA mount component via the VESA mounting holes, wherein the device bracket is configured to be attachable to the support bracket by:

engaging the ridge with a rim of the first basin such that the engagement aligns the device bracket relative to the support bracket;

moving the device bracket towards the support bracket such that:

the ridge protrudes into the first basin; and the mounting spools protrude through the mounting slots in unlocked positions, and sliding the device bracket along the support bracket such that the mounting spools move into locked positions in the mounting slots.

2. The system of claim 1, wherein the ridge and the first basin are configured such that, in a state of the device bracket being held against the support bracket and the ridge protruding in the first basin, engagement of the ridge with the rim of the first basin constrains motion of the device bracket to translation along a first axis parallel to the first face.

3. The system of claim 2, wherein, in the state of the device bracket being held against the support bracket and the ridge protruding into the first basin, the second plateau protrudes into the second basin and engages with the ridge, the engagement of the ridge with the second plateau additionally constrains motion of the device bracket to motion along the first axis.

4. The system of claim 3, wherein respective widths of the ridge and the first basin are substantially equal, and respective widths of the second basin and the second plateau are substantially equal.

5. The system of claim 2, wherein a length of the first basin exceeds a length of the ridge such that the first basin constrains the device bracket to motion between a first position and a second position along the first axis, and wherein, on condition of the device bracket being in the first position, the mounting spools are in the unlocked positions, and on condition of the device bracket being in the second position, the mounting spools are in the locked positions.

6. The system of claim 2, wherein respective widths of the ridge and the first basin are substantially equal.

7. The system of claim 1, wherein the device bracket further comprises a plurality of captive fasteners, each configured to extend into a corresponding first coupling opening in the information processing device to couple the device bracket to the information processing device.

8. The system of claim 7, wherein the support bracket comprises a plurality of second coupling openings configured to receive fasteners to attach the support bracket to the support structure, wherein the device bracket further comprises a plurality of clearance openings arranged to, in a state of the device bracket being mounted to the support bracket, align with the second coupling openings and receive the fasteners, and wherein each clearance opening has a width and a length greater than a corresponding fastener to not obstruct motion of the device bracket.

9. The system of claim 1, wherein each mounting slot of the set of mounting slots has a first portion with a first width and a second portion with a second width which is greater than the first width, the first portion coupled to the second portion, wherein each mounting spool of the plurality for mounting spools comprises a post having a third width which is smaller than the first width and a cap having a fourth width which is larger than the first width and smaller than the second width, and wherein the unlocked positions of the mounting spools correspond to the mounting spools being in the second portions of the mounting slots, and the locked positions of the mounting spools correspond to the mounting spools being in the first portions of the mounting slots.

10. An information processing system comprising:

the information processing device comprising the chassis and a primary system board housed in the chassis; and the information processing device mounting system of claim 1, wherein the device bracket is part of, or coupled to, the chassis.

11. A method for mounting an information processing device to a support structure, comprising:

positioning an assembly comprising the information processing device and a device bracket adjacent to a support bracket attached to the support structure, wherein the device bracket is attached to or part of a chassis of the information processing device and comprises a first plateau, a set of mounting slots in the first plateau, a first basin recessed from and encircled by the first plateau, a second plateau protruding from and encircled by the first basin, and a set of VESA mounting holes arranged in a VESA compatible pattern in the second plateau, and wherein the support bracket comprises a first face, a ridge protruding from the first face, a second basin recessed from and encircled by the ridge, and a set of mounting spools arranged in the first face;

engaging the ridge with a rim of the first basin such that the device bracket is aligned relative to the support bracket by the engagement;

moving the device bracket towards the support bracket such that:

the ridge protrudes into the first basin; and the mounting spools protrude through the mounting slots in unlocked positions; and sliding the device bracket along the support bracket such that the mounting spools move into locked positions in the mounting slots to mount the information processing device to the support structure.

12. An information processing device mounting system, comprising:

a device bracket configured to be attached to, or being part of, a chassis of an information processing device; and a support bracket configured to be attached to a support structure for holding the information processing device, wherein the device bracket comprises a first face, a first set of mounting features in the first face, a first guide structure coupled to the first face, and a set of VESA mounting holes arranged in a VESA compatible pattern in the first guide structure, wherein the support bracket comprises a second face, a second set of mounting features arranged in the second face, and a second guide structure coupled to the second face, wherein the first guide structure and the second guide structure comprise complementary convex and concave portions, wherein the device bracket is configured to be attachable to a VESA mount component via the VESA mounting holes, and wherein the device bracket is configured to be attachable
to the support bracket by:
engaging the convex portion with the concave portion
such that the engagement aligns the device bracket
relative to the support bracket;
moving the device bracket towards the support bracket
such that:
the convex portion protrudes into the concave portion;
and
the first and second sets of mounting features engage
one another in unlocked positions; and
sliding the device bracket along the support bracket such
that the first and second sets of mounting features move
into locked positions.

13. The system of claim 12, wherein the first guide
structure comprises the concave portion and the second
guide structure comprises the convex portion.

14. The system of claim 13, wherein the convex portion
comprises a ridge or a plateau and the concave portion
comprises a basin configured to receive the ridge or the
plateau.

15. The system of claim 13, wherein the first set of
mounting features comprise mounting slots and the second
set of mounting features comprise mounting spools.

16. The system of claim 13, wherein the second set of
mounting features comprise mounting slots and the first set
of mounting features comprise mounting spools.

17. The system of claim 12, wherein the second guide
structure comprises the concave portion and the first guide
structure comprises the convex portion.

18. The system of claim 17, wherein the convex portion
comprises a ridge or a plateau and the concave portion
comprises a basin configured to receive the ridge or the
plateau.

19. The system of claim 17, wherein the first set of
mounting features comprise mounting slots and the second
set of mounting features comprise mounting spools.

20. The system of claim 17, wherein the second set of
mounting features comprise mounting slots and the first set
of mounting features comprise mounting spools.

* * * * *